United States Patent
Kondou (10) Patent No.: US 8,431,905 B2
(45) Date of Patent: Apr. 30, 2013

(54) RADIATION IMAGE DETECTOR

(75) Inventor: Kiyoshi Kondou, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 13/307,901

(22) Filed: Nov. 30, 2011

(65) Prior Publication Data

US 2012/0138807 A1    Jun. 7, 2012

(30) Foreign Application Priority Data

Dec. 1, 2010    (JP) .................. 2010-268143

(51) Int. Cl.
*G01T 1/24*    (2006.01)

(52) U.S. Cl.
USPC ................................... 250/370.08

(58) Field of Classification Search ........... 250/370.08, 250/370.09, 370.01
See application file for complete search history.

(56) References Cited

U.S. PATENT DOCUMENTS 7,880,145 B2 *    2/2011 Yagi et al. ............... 250/370.09

FOREIGN PATENT DOCUMENTS

| JP | 2000174982 A | * | 6/2000 |
|---|---|---|---|
| JP | 2003-087656 A | | 3/2003 |
| JP | 2007-524234 A | | 8/2007 |
| JP | 2009-081443 A | | 4/2009 |
| JP | 2009-128186 A | | 6/2009 |
| JP | 2009-141439 A | | 6/2009 |
| JP | 2010-046315 A | | 3/2010 |
| WO | 2007/099850 A1 | | 9/2007 |

OTHER PUBLICATIONS

Notification of Reasons for Refusal, dated Oct. 3, 2012, issued in corresponding JP Application No. 2010-268143, 6 pages in English and Japanese.

* cited by examiner

*Primary Examiner* — David Porta
*Assistant Examiner* — Faye Boosalis
(74) *Attorney, Agent, or Firm* — Sughrue Mion, PLLC (57) ABSTRACT

A FPD includes a signal processing circuit and noise detecting elements provided for each group containing plural columns of pixels. The signal processing circuit converts signal charges accumulated in the pixels into electric signals and outputs the electric signals. Each of the noise detecting elements has the same structure as that of the pixel, but does not have a function of accumulating the electric charges. A voltage signal of the noise detecting element represents noise components. A subtractor subtracts the voltage signal of the noise detecting elements from a voltage signal of the pixels which is outputted from the noise processing circuit.

8 Claims, 4 Drawing Sheets

RADIATION IMAGE DETECTOR

BACKGROUND OF THE INVENTION

1. Field of the Invention

The present invention relates to a radiation image detector for detecting a radiation image.

2. Description of the Related Art

A radiation imaging system such as X-ray imaging system is constituted of an X-ray generator for generating X-rays and an X-ray imaging device for capturing an X-ray image of a subject. The X-ray generator has an X-ray source for irradiating X-rays toward a subject, an X-ray source controller for controlling operation of the X-ray source, and an irradiation switch for entering a command for starting irradiation of X-rays. The X-ray imaging device has an X-ray image detector for detecting an X-ray image in response to the X-rays having transmitted through the subject, and an imaging controller for controlling operation of the X-ray image detector.

An X-ray image detector provided with a flat panel detector (FPD) instead of an X-ray film or an imaging plate (IP) as a detector has been in widespread use, recently. The FPD has a matrix of pixels for accumulating signal charges by an amount corresponding to an amount of the X-rays incident thereon. In the FPD, the signal charges are accumulated in each of the pixels, and a signal processing circuit converts the accumulated signal charges into a voltage signal (pixel signal), so as to detect an X-ray image representing image information of the subject and output the X-ray image as digital image data.

A portable X-ray image detector (hereinafter referred to as electronic cassette) in which a FPD is contained in a rectangular parallelepiped housing has been in practical use. The electronic cassette is attached to an imaging table designed for a film cassette or an imaging plate (IP) cassette, and used. Alternatively, the electronic cassette is held by a subject himself/herself, and used so as to capture an image of a body site which is difficult to capture by a floor-standing type electronic cassette. Further, in some cases, the electronic cassette is taken out from a hospital to somewhere having no imaging table and used therein, so as to capture an image of a housebound elderly person or an emergent patient suffered from an accident or a natural disaster.

Generally speaking, output of an electrical component is susceptible to noise caused by an internal factor of the electrical component itself or an external factor such as an ambient environment. Of course, the X-ray image detector equipped with a lot of electrical components is no exception. When the subject or radiographer happens to bump into the X-ray image detector and the X-ray image detector is applied with impact, the X-ray image detector vibrates in response to the impact, and the vibration of the X-ray image detector causes noise. When the noise is applied to a signal of image data, the noise causes a false image on the X-ray image, and the false image may lead to diagnosis error.

In view of the above, there have been conventionally proposed various methods for preventing degradation of image quality of an X-ray image due to noise. According to Japanese Patent Laid-Open Publication No. 2009-081443, in order to eliminate noise generated by potential fluctuation of a scanning line of a TFT provided in a FPD, there are provided dummy pixels each having no function of accumulating signal charges corresponding to the X-rays, and an output signal of the dummy pixels is subtracted from an output signal of effective pixels. According to Japanese Patent Laid-Open Publication No. 2009-128186, in order to eliminate noise generated by fluctuation of bias voltage entirely applied to a FPD, a filter circuit and a buffer circuit are connected between the FPD and a bias supply.

As the signal processing circuit for converting the signal charges accumulated in the pixels into the voltage signal, a dedicated integrated circuit such as application specific integrated circuit (ASIC) is used, for example. The ASIC is arranged for each group containing plural rows of pixels (256 rows of pixels, for example). There are individual differences among the ASICs, and therefore introduction of the noise varies in accordance with the group corresponding to each of the ASICs. Further, the ASIC itself is a generation source of the noise.

Since the introduction of the noise varies in accordance with the group corresponding to each of the ASICs as described above, even if the output signal of the dummy pixels is uniformly subtracted from the output signal of the effective pixels as disclosed in Japanese Patent Laid-Open Publication No. 2009-081443, it is not possible to eliminate the noise components sufficiently, or image components which are not the noise components are unnecessarily eliminated. Moreover, according to the method disclosed in Japanese Patent Laid-Open Publication No. 2009-128186, although it is possible to eliminate the noise components generated by the fluctuation of bias voltage, it is impossible to eliminate the noise components generated by the ASICs themselves.

SUMMARY OF THE INVENTION

In view of the above, an object of the present invention is to provide a radiation image detector capable of surely eliminating noise components from a signal of a radiation image.

In order to achieve the above object, a radiation image detector of the present invention includes a plurality of pixels, a signal processing circuit, a noise detecting section, and a subtractor. A plurality of the pixels are two-dimensionally arranged in columns and rows. A plurality of the columns form one group. Each of the pixels generates signal charges by an amount corresponding to an amount of radiation, and accumulates the signal charges. The signal processing circuit is provided for each of the groups so as to convert the signal charges accumulated in each of the pixels to an electric signal. The noise detecting section is provided for each of the groups so as to detect a noise signal containing no signal charges corresponding to the radiation. The subtractor subtracts the noise signal from the electric signal in each of the groups to perform noise correction.

The noise detecting section has at least one column of noise detecting elements, and performs the subtraction on the pixels and the noise detecting elements in the same row.

The noise detecting element is equivalent to the pixel whose function of accumulating the signal charges corresponding to the radiation is nullified.

The subtractor performs analog or digital subtraction.

The signal processing circuit has an integration amplifier, an amplifier, a sample hold section, and a multiplexer. The integration amplifier integrates the signal charges for a predetermined period. The amplifier amplifies the electric signal outputted from the integration amplifier. The sample hold section keeps a level of the electric signal. The multiplexer successively selects the electric signal kept by the sample hold section and outputs the electric signal to an A/D converter.

The signal processing circuit is preferably constituted of an ASIC. The radiation image detector is preferably an electronic cassette contained in a portable housing.

According to the present invention, plural rows of the pixels are made into one group, and the noise detecting elements are provided for each of the groups. Since subtraction is performed between the electric signal of the pixels and the electric signal of the noise detecting element in the same group, it is possible to perform elimination of noise components suitable for each of the groups. Accordingly, it is possible to surely eliminate the noise components from the signal of the radiation image.

DESCRIPTION OF THE DRAWINGS

The above objects and advantages of the present invention will become easily understood by one of ordinary skill in the art when the following detailed description of the preferred embodiments would be read in connection with the accompanying drawings, wherein.

DESCRIPTION OF THE PREFERRED EMBODIMENTS

Figure 1:
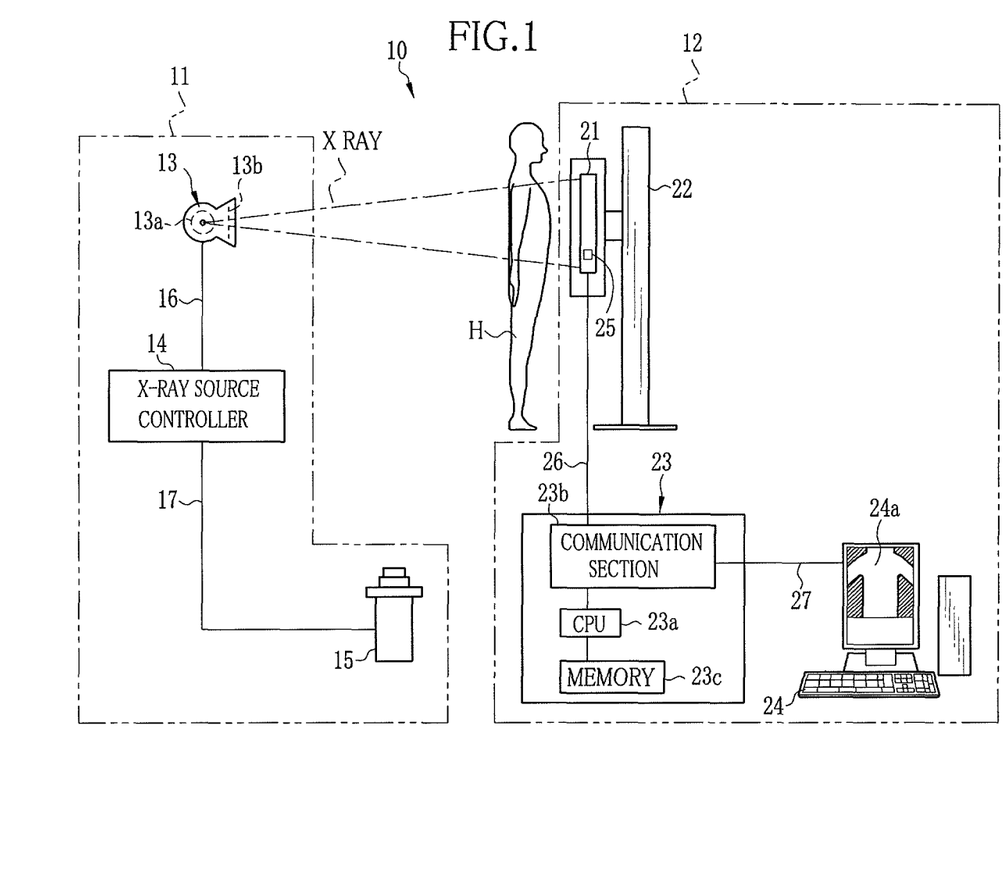
FIG. 1 is a schematic diagram illustrating a structure of an X-ray imaging system.

In FIG. 1, an X-ray imaging system 10 includes an X-ray generator 11 and an X-ray imaging device 12. The X-ray generator 11 consists of an X-ray source 13, an X-ray source controller 14 for controlling operation of the X-ray source 13, and an irradiation switch 15. The X-ray source 13 has an X-ray tube 13a for emitting X-rays and a collimator 13b for limiting an irradiation field of the X-rays emitted from the X-ray tube 13a.

The X-ray tube 13a has a cathode and an anode. The cathode is composed of a filament for emitting thermal electrons. The thermal electrons emitted from the cathode collide against the anode (target) to generate the X-rays. The target is in the shape of a circular disc. The target is a rotating anode which rotates such that a focal spot thereof moves along a circumferential orbit. Thereby, it is possible to prevent elevation in temperature of the focal spot against which the thermal electrons collide. The collimator 13b is composed of a plurality of lead plates blocking the X-rays. The lead plates are disposed in the form of parallel crosses. At the center of the collimator 13b is formed an irradiation opening for transmitting the X-rays. The irradiation field is limited by moving the position of the lead plates so as to change the size of the irradiation opening.

The X-ray source controller 14 includes a high-voltage generator for supplying high voltage to the X-ray source 13, and a control section. The control section controls tube voltage for defining an energy spectrum of the X-rays emitted from the X-ray source 13, tube current for defining an irradiation amount of the X-rays per unit of time, and an irradiation time of the X-rays. The high-voltage generator generates high tube voltage by increasing input voltage using a transformer, and supplies driving power to the X-ray source 13 via a high-voltage cable 16. According to this embodiment, the X-ray generator 11 does not have a function of communicating with the X-ray imaging device 12. The imaging conditions such as the tube voltage, tube current, and irradiation time are manually set by a radiographer through an operation panel of the X-ray source controller 14.

The irradiation switch 15 to be operated by the radiographer is connected to the X-ray source controller 14 through a signal cable 17. The irradiation switch 15 is a two-step push switch. Upon a first-step push of the irradiation switch 15, a warm-up start signal for starting warm-up operation of the X-ray source 13 is generated. Upon a second-step push of the irradiation switch 15, an irradiation start signal for causing the X-ray source 13 to start emitting the X-rays is generated. The warm-up start signal and the irradiation start signal are inputted to the X-ray source controller 14 through the signal cable 17.

The X-ray source controller 14 controls the operation of the X-ray source 13 based on the control signals from the irradiation switch 15. Upon receiving the warm-up start signal, the X-ray source controller 14 actuates a heater to preheat the filament, and causes the target to start rotating to achieve a desired rotational speed. The time required for the warm-up operation of the X-ray source 13 is approximately in the range of 200 msec to 1500 msec. The radiographer enters a warm-up start command by the first-step push of the irradiation switch 15, and after a lapse of time required for the warm-up operation, the radiographer enters an irradiation start command by the second-step push of the irradiation switch 15.

Upon receiving the irradiation start signal, the X-ray source controller 14 starts supplying electricity to the X-ray source 13, and starts measuring irradiation time of the X-rays by actuating a timer. When the measured X-ray irradiation time reaches a value setup in the imaging conditions, the X-ray source controller 14 stops the X-ray irradiation. Although the X-ray irradiation time depends on the imaging conditions, the maximum X-ray irradiation time is set approximately in the range of 500 msec to 2 sec in most cases in capturing a static radiographic image. The upper limit of the X-ray irradiation time is set to the maximum X-ray irradiation time.

The X-ray imaging device 12 includes an electronic cassette 21, an imaging table 22, an imaging controller 23, and a console 24. The electronic cassette 21 consists of an irradiation detecting sensor 25 and a flat panel detector (FPD) 36 (see FIG. 2). The irradiation detecting sensor 25 and the FPD 36 are contained in a portable housing. The electronic cassette 21 receives the X-rays which have been irradiated from the X-ray source 13 and transmitted through a subject H, and outputs an X-ray image. The electronic cassette 21 is approximately in the shape of a flat parallelepiped. The size of a flat surface of the electronic cassette 21 is approximately the same as that of a film cassette or an IP cassette.

The imaging table 22 has a slot to which the electronic cassette 21 is detachably attached, and holds the electronic cassette 21 in a state that an incident surface of the electronic cassette 21 on which the X-rays are incident is faced to the X-ray source 13. Since the size of the housing is approximately the same as that of the film cassette or the IP cassette, the electronic cassette 21 also can be attached to an imaging table designed for the film cassette or the IP cassette. Note that, although an upright-imaging table for upright imaging of the subject H is taken as a sample for the imaging table 22, a supine-imaging table for supine imaging of the subject H also may be used as the imaging table 22.

Figure 2:
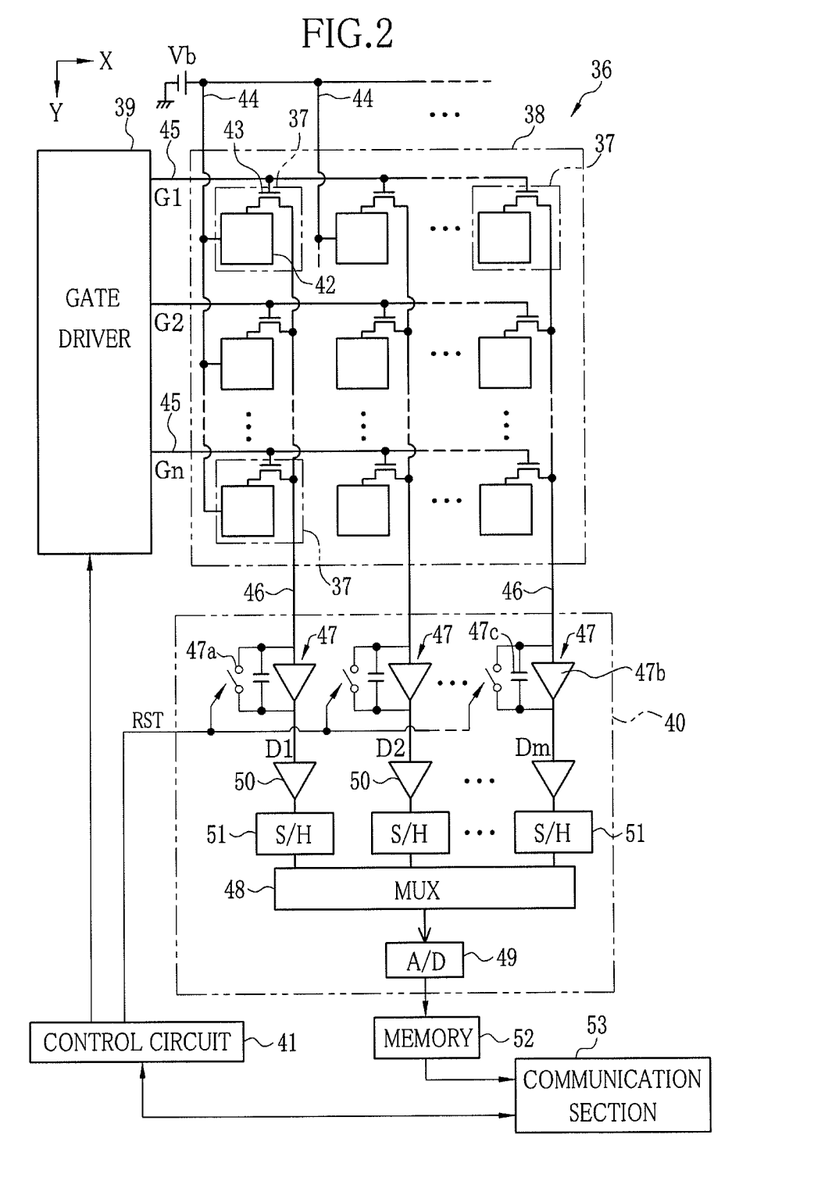
FIG. 2 is a diagram illustrating an electrical structure of a FPD.

As shown in FIG. 2, the FPD 36 includes an imaging field 38, a gate driver 39, a signal processing circuit 40, and a control circuit 41, which are disposed on a TFT (thin film transistor) active matrix substrate. The imaging field 38 consists of arrangement of a plurality of radiation detecting pixels (hereinafter abbreviated as pixels) 37 for accumulating signal charges by an amount corresponding to the incident amount of the X-rays. The gate driver 39 drives the pixels 37, and controls readout of the signal charges. The signal processing circuit 40 converts the signal charges read out from the pixels 37 into digital data, and outputs the digital data. The control circuit 41 controls the gate driver 39 and the signal processing circuit 40 to control operation of the FPD 36. The plurality of pixels are arranged in a two-dimensional matrix with n-rows (corresponding to X direction) and m-columns (corresponding to Y direction) at a predetermined pitch.

The FPD 36 is of an indirect-conversion type, which has a scintillator (phosphor) for converting the X-rays into visible light, and photoelectrically converts the visible light converted by the scintillator into electric charges using the pixels 37. The scintillator is disposed so as to face an entire surface of the imaging field 38 on which the pixels 37 are arranged. Note that, a direct-conversion type FPD having a conversion layer such as amorphous selenium for directly converting the X-rays into the electric charges also may be used.

Each of the pixels 37 includes a photodiode 42 as a photoelectric conversion element for generating electric charges (pairs of a negative electron and a positive hole) in response to the visible light incident thereon, a capacitor (not shown) for accumulating the electric charges generated by the photodiode 42, and a thin film transistor (TFT) 43 as a switching element.

The photodiode 42 has a semiconductor layer (PIN type, for example) for generating the electric charges, and upper and lower electrodes disposed on and under the semiconductor layer, respectively. The lower electrode of the photodiode 42 is connected to the TFT 43, and the upper electrode thereof is connected to a bias line 44 through which bias voltage Vb is applied. The application of the bias voltage Vb generates an electric field in the semiconductor layer. Thus, the negative electrons are attracted to one of the upper and lower electrodes of positive polarity, and the positive holes are attracted to the other of the upper and lower electrodes of negative polarity. Thereby, the electric charges are accumulated in the capacitor.

A gate electrode of the TFT 43 is connected to a scanning line 45, a source electrode of the TFT 43 is connected to a signal line 46, and a drain electrode of the TFT 43 is connected to the photodiode 42, respectively. The scanning lines 45 and the signal lines 46 are laid out into a lattice. The number of the scanning lines 45 corresponds to the number (n) of the rows of the pixels 37, and the number of the signal lines 46 corresponds to the number (m) of the columns of the pixels 37, in the imaging field 38. The scanning lines 45 are connected to the gate driver 39, and the signal lines 46 are connected to the signal processing circuit 40.

The gate driver 39 drives the TFT 43 to execute accumulation operation for accumulating the signal charges corresponding to the incident amount of X-rays (X-ray dosage) in the pixels 37, readout operation for reading out the signal charges from the pixels 37 (referred to as real-reading operation), and reset operation (referred to as dummy-reading operation). The control circuit 41 controls the timing for starting each of the above operations to be executed by the gate driver 39 based on a control signal inputted from the imaging controller 23 through a communication section 53.

During the accumulation operation, the TFTs 43 are turned off, and the signal charges corresponding to the X-ray dosage are accumulated in the pixels 37. During the readout operation, the gate driver 39 successively generates gate pulses G1 to Gn for driving the TFTs 43 at one time on a row-by-row basis. In response to the gate pulses G1 to Gn, the scanning lines 45 are activated on a one-by-one basis to turn on the TFTs 43 connected to the scanning lines 45 on a row-by-row basis. When the TFT 43 is turned on, the electric charges accumulated in the capacitor of the pixel 37 are read out to the signal line 46, and inputted to the signal processing circuit 40.

The semiconductor layer of the photodiode 42 generates dark charges regardless of presence or absence of the incident X-rays. Because of the application of the bias voltage Vb, the dark charges are accumulated in the capacitor. The dark charges generated in the pixels 37 are noise components for the image data, and therefore the reset operation is executed to eliminate the dark charges. In other words, the pixel reset operation aims at discharging the dark charges generated in the pixels 37 through the signal lines 46.

For example, the pixel reset operation is carried out by a successive reset method, in which the pixels 37 are reset on a row-by-row basis. In the successive reset method, the gate pulses G1 to Gn are successively generated from the gate driver 39 to the scanning lines 45, so as to turn on the TFTs 43 of the pixels 37 on a row-by-row basis, as in the case of the readout operation of the signal charges. While the TFTs 43 are turned on, the dark charges flow from the pixels 37 through the signal lines 46 to integration amplifiers 47. In the reset operation, a multiplexer (MUX) 48 does not read out the electric charges accumulated in the integration amplifiers 47, in contrast to the readout operation. In synchronism with the generation of each of the gate pulses G1 to Gn, a reset pulse RST is outputted from the control circuit 41. The electric charges accumulated in the capacitor 47c are discharged by turning on a reset switch 47a in response to the reset pulse RST. Thereby, the integration amplifiers 47 are reset.

The signal processing circuit 40 includes the integration amplifiers 47, the MUX 48, an A/D converter 49, and the like. The integration amplifiers 47 are connected to the signal lines 46 on a one-by-one basis. The integration amplifier 47 consists of an operational amplifier 47b, the capacitor 47c, and a reset switch 47a. The signal line 46 is connected to one of input terminals of the operational amplifier 47b. The other of the input terminals of the operational amplifier 47b is connected to ground (GND). The integration amplifiers 47 integrate the electric charges inputted from the signal lines 46, and convert the electric charges into voltage signals D1 to Dm, to output the voltage signals D1 to Dm. An output terminal of the operational amplifier 47b of each column is connected to the MUX 48 through an amplifier 50 and a sample hold (S/H) section 51. The A/D converter 49 is connected to the MUX 48 on its output side.

The MUX 48 successively selects one of the integration amplifiers 47b connected in parallel, and inputs the voltage signals D1 to Dm, which are outputted from the selected integration amplifiers 47, to the A/D converter 49 in a serial manner. The A/D converter 49 converts the inputted voltage signals D1 to Dm into digital data, and outputs the digital data to a memory 52 contained in the housing of the electronic cassette 21. Note that an amplifier is connected between the MUX 48 and the A/D converter 49.

When the MUX 48 reads out the voltage signals D1 to Dm of one row from the integration amplifiers 47, the control circuit 41 outputs the reset pulse RST to the integration amplifiers 47 to turn on the reset switches 47a. Thus, the signal charges of one row that are accumulated in the capacitors 47c are discharged, and the integration amplifiers 47 are reset. After the reset of the integration amplifiers 47, the gate driver 39 outputs the gate pulse for the next row to start reading out the signal charges from the pixels 37 of the next row. By successively repeating the operations described above, the signal charges are read out from the pixels 37 of every row. Note that, this reset operation of the integration amplifiers 47 is different from the pixel reset operation described above.

After the completion of the readout of the signal charges from every row, image data representing a single frame of the X-ray image is recorded in the memory 52. The image data is read out from the memory 52, and outputted to the imaging controller 23 through the communication section 53 and a communication cable (see FIG. 1). Thus, the X-ray image of the subject H is detected.

Figure 3:
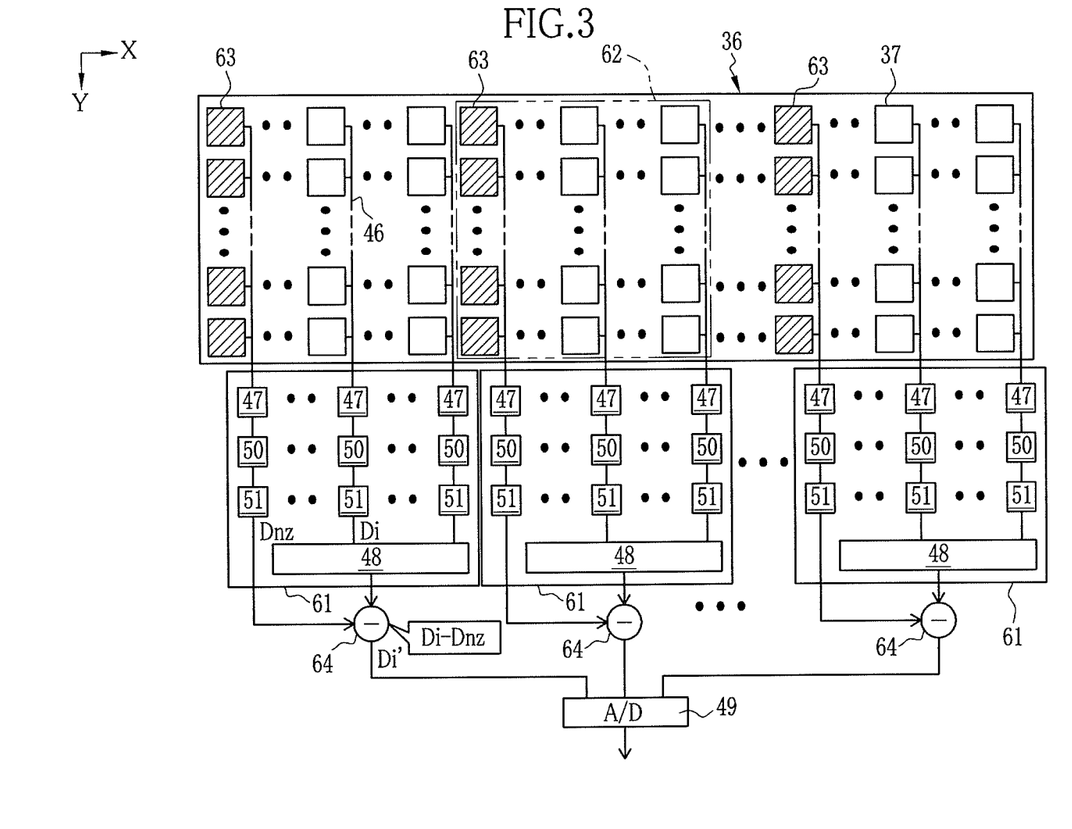
FIG. 3 is a diagram illustrating a specific structure of the FPD and a signal processing circuit.

As shown in FIG. 3, in the signal processing circuit 40, the integration amplifiers 47, the amplifiers 50, the S/H sections 51, and the MUX 48 are contained together in one application specific integrated circuit (ASIC) corresponding to one of groups 62 each containing plural columns (256 columns, for example) of the pixels 37.

Each of the groups 62 corresponding to one ASIC 61 is provided with a noise detecting section. Each of the noise detecting sections has one or plural columns of noise detecting elements 63 shown by hatching in the drawing. Note that the drawing shows an example containing one column of the noise detecting elements 63. For example, the noise detecting elements 63 are disposed in the column at the end of each of the groups 62. Each of the noise detecting elements 63 is configured not to generate or accumulate the signal charges corresponding to the X-rays. For example, the semiconductor layer having a photoelectric conversion function and the capacitor are electrically disconnected. Alternatively, the semiconductor layer is blocked from light. Therefore, the signal charges corresponding to the X-rays are not accumulated in the noise detecting elements 63, and a voltage signal Dnz of the noise detecting elements 63 mainly represents the noise components.

Between the MUX 48 and the A/d converter 49 in each of the groups 62 is provided with a subtractor 64. The signal line 46 of the column of the noise detecting elements 63 is directly connected to the subtractor 64 without the intervention of the MUX 48. The subtractor 64 subtracts the voltage signal Dnz of the noise detecting elements 63 from a voltage signal Di (i=1 to m) of the pixels 37. A voltage signal Di' (=Di−Dnz) as a subtraction result is outputted to the A/D converter 49. Thereby, the data to be recorded in the memory 52 is the digitalized voltage signal Di'. Note that, since the signal charges of the pixels 37 in one row along the X direction are read out at one time in the readout operation, the voltage signals Di and Dnz to be processed by the subtractor 64 upon reading of the pixels 37 in one row correspond to the output from the pixels 37 and the noise detecting elements 63 in the same row.

During the accumulation operation or the readout operation, when the radiographer or the subject H happens to bump into the imaging table 22, impact may be applied to the electronic cassette 21, and the electronic cassette 21 may vibrate in response to the impact. Additionally, the electronic cassette 21 may vibrate in various situations, such as when the electronic cassette 21 is held by the subject H, when the electronic cassette 21 is put on the subject H to perform radiography, when radiography is performed in a visiting car which is caused to vibrate every time the subject H gets on/off the visiting car, and when radiography is performed using a power generator as a power source outside the hospital.

Vibration of the electronic cassette 21 causes electrical noise (hereinafter referred to as vibration noise). The vibration noise disturbs the bias voltage Vb, and thereby inductive charges are generated. The vibration noise particularly affects the signal processing circuit 40 and the signal lines 46, and is added as noise components to the voltage signal. When the noise components are added to the voltage signal, the image quality of the X-ray image deteriorates, and the deterioration of the X-ray image interferes with diagnosis.

Since the vibration noise is unexpected, it is impossible to deal with the vibration noise by a so-called off-set correction for eliminating the noise components resulting from the dark charges. Accordingly, in this embodiment, at least one noise detecting element 63 and the subtractor 64 are provided for each of the groups 62 of the pixels 37 corresponding to one ASIC 61, and the subtractor 64 subtracts the voltage signal Dnz of the noise detecting elements 63 from the voltage signal Di of the pixels 37. Therefore, even when the vibration noise is generated and superimposed as the noise components on the voltage signal, the noise components are surely eliminated from the voltage signal of the pixel 37, and thus making it possible to keep the image quality of the X-ray image at a preferable level.

The irradiation detecting sensor 25 is disposed at the vicinity of the imaging field 38 of the FPD 36. The irradiation detecting sensor 25 receives the irradiated X-rays, and outputs an irradiation detection signal in accordance with the X-ray dosage. The irradiation detection signal is inputted to the imaging controller 23 through the communication cable 26. The imaging controller 23 monitors a signal level of the irradiation detection signal so as to detect that irradiation of the X-rays is started by the X-ray source 13.

The control circuit 41 detects that the irradiation of the X-rays is started, when the signal level of the irradiation detection signal outputted from the irradiation detecting sensor 25 exceeds a threshold value. Then, the control circuit 41 shifts the operation of the FPD 36 from the pixel reset operation to the accumulation operation. The control circuit 41 counts the length of time that has elapsed since the accumulation operation started with use of a timer. Then, when the elapsed time achieves a predetermined length of time set in the imaging conditions, the control circuit 41 shifts the FPD 36 from the accumulation operation to the readout operation.

The imaging controller 23 is communicably connected to the electronic cassette 21 in a wired manner using the communication cable 26 or in a wireless manner, so as to control the electronic cassette 21. Concretely, the imaging controller 23 sends the imaging conditions to the electronic cassette 21 so as to cause the electronic cassette 21 to set the conditions for the signal processing of the FPD 36 (including gain of the amplifiers 50, for example), and controls each of the operations of the FPD 36 in an indirect manner. Further, the imaging controller 23 sends the image data from the electronic cassette 21 to the console 24.

In FIG. 1, the imaging controller 23 has a CPU 23a, a communication section 23b, and a memory 23c. The CPU 23a is used for overall control of the imaging controller 23. The communication section 23b communicates with the electronic cassette 21 in a wired manner or in a wireless manner, and further communicates with the console 24 through the communication cable 27. The communication section 23b and the memory 23c are connected to the CPU 23a. The memory 23c stores a control program to be executed by the CPU 23a in addition to various kinds of information such as a threshold value to be compared with the signal level of the irradiation detection signal of the irradiation detecting sensor 25.

The console 24 sends the imaging conditions to the imaging controller 23, and subjects X-ray image data sent from the imaging controller 23 to various kinds of image processing such as the off-set correction and gain correction. The image processing includes a processing for interpolating the voltage signal Dnz of the noise detecting elements 63 with the voltage signal Di of the peripheral pixels 37. The X-ray image after being subjected to the image processing is displayed on a display 24a of the console 24, and the X-ray image data is stored in a hard disk or a memory in the console 24, or a data storage device such as an image storage server connected to the console 24 over a network.

The console 24 receives input of an inspection order including information on the sex and age of the patient, the body site to be imaged, and the purpose of the inspection, and displays the inspection order on the display 24a. The inspection order is transferred from an external system such as HIS (hospital information system) or RIS (radiation information system) that manages patient information and inspection information related to the radiography, or inputted manually by the radiographer. The radiographer checks the contents of the inspection order on the display 24a, and inputs the imaging conditions in accordance with the contents on an operation screen of the console 24.

Next, the operation of the X-ray imaging system 10 having the above structure will be hereinafter described. When the radiography is performed with use of the X-ray imaging system 10, the height of the electronic cassette 21 set on the imaging table 22 is adjusted in accordance with the position of the body site of the subject H to be imaged. Also, the height of the X-ray source 13 and the size of the irradiation field are adjusted in accordance with the height of the electronic cassette 21 and the size of the body site to be imaged.

Next, the electronic cassette 21 is powered on. At this time, the bias voltage Vb is supplied from a power circuit to the pixels 37 of the FPD 36. However, the operation of each of the gate driver 39 and signal processing circuit 40 remains halted. Then, the imaging conditions are entered from the console 24, and the imaging conditions are set up in the electronic cassette 21 via the imaging controller 23. The imaging conditions are also set up in the X-ray source controller 14. After the setting of the imaging conditions, the FPD 36 starts the pixel reset operation.

When preparation for radiography as described above is completed, the radiographer gives a first-step push of the irradiation switch 15. Thus, the warm-up start signal is sent to the X-ray source controller 14, to start warming up the X-ray source 13. After the elapse of a predetermined length of time, the radiographer gives a second-step push of the irradiation switch 15. Thus, the irradiation start signal is sent to the X-ray source controller 14 to start the X-ray irradiation.

While repeatedly performing the reset operation, the FPD 36 detects that the irradiation of the X-rays is started with use of the irradiation detecting sensor 25. When the irradiation detecting sensor 25 detects the start of irradiation of the X-rays, the control circuit 41 shifts the FPD 36 from the reset operation to the accumulation operation. During the accumulation operation, the X-rays having been transmitted through the subject H are incident on the imaging field 38 of the FPD 36, and the signal charges corresponding to the X-ray dosage are accumulated in the pixels 37. In contrast, the signal charges are not accumulated in the noise detecting elements 63.

The X-ray source controller 14 stops the irradiation of the X-rays after a lapse of irradiation time set up in the imaging conditions. After a lapse of predetermined length of time corresponding to the irradiation time set up in the imaging conditions, the FPD 36 completes the accumulation operation and shifts to the readout operation. In the readout operation, the signal charges accumulated in the pixels 37 are successively read out from a first row on a row-by-row basis. Then, the signal charges are inputted to the MUX 48 through the integration amplifier 47, the amplifier 50, and the S/H section 51. In contrast, the electric charges of the noise detecting elements 63 are inputted to the subtractor 64 without the intervention of the MUX 48.

The subtractor 64 subtracts the voltage signal Dnz of the noise detecting elements 63 from the voltage signal Di of the pixels 37 outputted from the MUX 48, and then outputs the voltage signal Di' as the subtraction result. The noise caused by vibration of the electronic cassette 21 or the like is corrected on a row-by-row basis per unit of the group 62.

The voltage signal Di' is digitalized by the A/D converter 49 and stored as the X-ray image data in the memory 52. Upon completion of readout of the signal charges accumulated in the pixels 37 from the first row, the reset switch 47a is turned on to reset the integration amplifier 47. Thereafter, the signal charges accumulated in the pixels 37 start to be read out from the second row.

Upon completion of readout of the signal charges from every row, image data representing a single frame of the X-ray image is stored in the memory 52. After the readout operation, in the case where the next imaging conditions are not set up yet, the FPD 36 returns to the state just after the power is turned on, and in the case where the next imaging conditions are already set up, the FPD 36 restarts the reset operation.

The image data stored in the memory 52 is sent to the console 24 through the imaging controller 23. The image data is subjected to various kinds of processing such as the off-set correction, gain correction, and pixel interpolation by the console 24. Thereafter, the image data is displayed on the display 24a of the console 24, or stored in the data storage device.

As described above, according to the present invention, the noise detecting elements 63 are provided for each of the groups 62 corresponding to one ASIC 61 constituting the signal processing circuit 40, such that the noise components are removed from each of the groups 62. Therefore, the individual difference among the ASICs 61 can be absorbed, and thus it becomes possible to eliminate the noise components generated by the ASICs 61 themselves.

Since the pixels 37 in a desired column are used as the noise detecting elements 63 among the pixels 37 in the plurality of columns, it is unnecessary to change the production process of the FPD 36 and the operation control procedure so much in comparison with those of the conventional methods.

Since the subtraction between the analog signals is performed to eliminate the noise components, the subtraction process requires only a short length of time. Further, it is unnecessary to save an area for recording the voltage signal Dnz outputted from the noise detecting element 63 in the memory 52.

Figure 4:
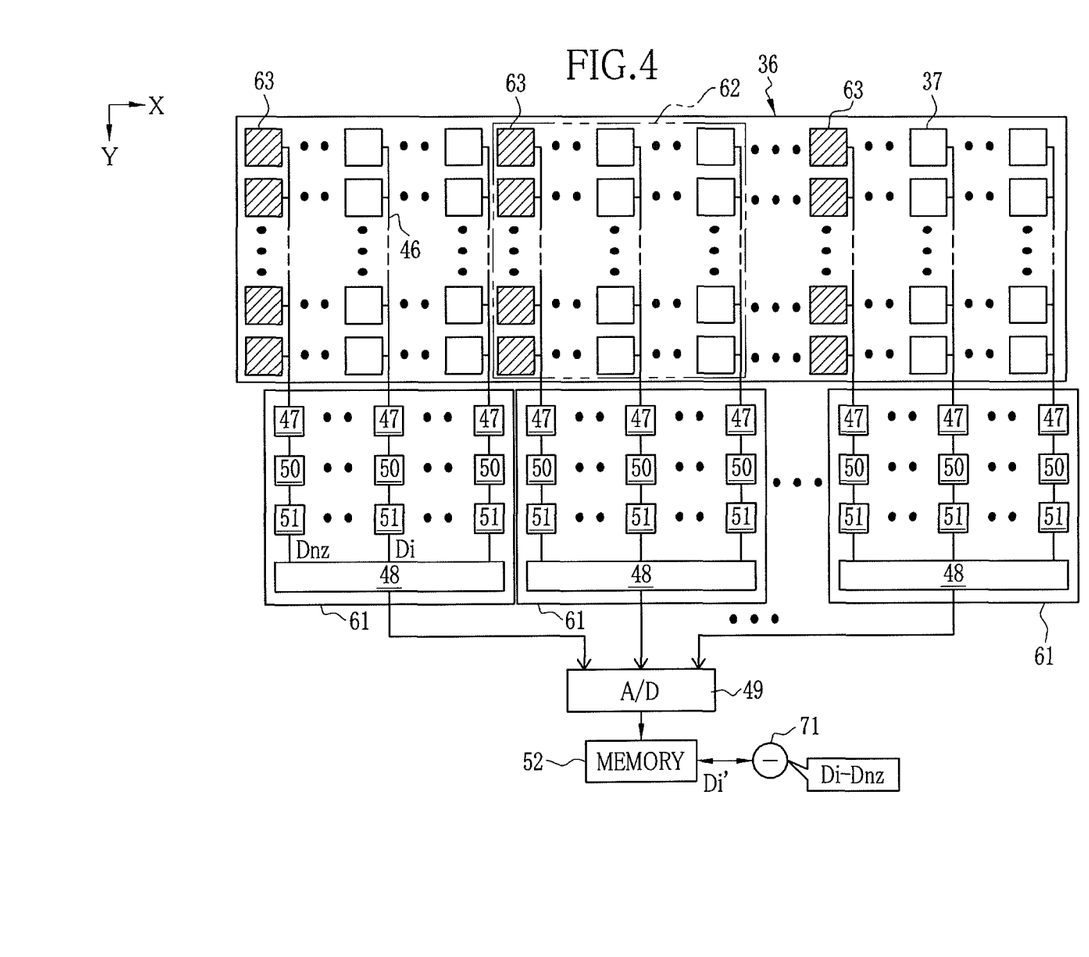
FIG. 4 is a diagram illustrating another specific structure of the FPD and the signal processing circuit.

Note that, as shown in FIG. 4, the noise components may be eliminated from the digitalized voltage signal after being subjected to the A/D conversion. In this case, the signal line 46 of the column of the noise detecting elements 63 is also connected to the MUX 48, and further one subtractor 71 is prepared. The memory 52 is accessed through the subtractor 71 to read out the voltage signal Di of the pixels 37 and the voltage signal Dnz of the noise detecting elements 63 for each of the groups 62, and then subtraction between the voltage signals Di and Dnz is performed. The voltage signal Di' as the subtraction result is returned to the memory 52. In this embodiment, since it is unnecessary to provide the subtractor for each of the groups 62, the cost for the components can be suppressed.

In the case where plural rows of the noise detecting elements 63 are provided, a simple average of the voltage signals Dnz of the plural noise detecting elements 63 in one row, or an average of the voltage signals Dnz exclusive of the maximum and minimum value thereof may be used to perform the subtraction. The subtraction using plural voltage signals Dnz is more preferable than the subtraction using one voltage signal Dnz for the purpose of eliminating the noise surely.

The X-ray imaging system 10 is not limited to a type of being installed in a radiography room of a hospital, but may be of a type installed in a visiting car, or of a portable type in which the X-ray source 13, the X-ray source controller 14, the electronic cassette 21, the imaging controller 23, and the like are carried to an accident scene or natural disaster scene requiring emergency medical treatment, or a house of a patient who requires at-home diagnosis, for the purpose of performing the radiography. The X-ray imaging system of the type installed in the visiting car or the portable type easily and frequently receives impact in comparison with that of the type installed in the radiography room of the hospital, and therefore applying the present invention to the X-ray imaging system of such types achieves considerable effect.

Although the irradiation detecting sensor 25 is disposed at the vicinity of the imaging field 38 of the FPD 36 in the above embodiment, a photo timer may be disposed between the FPD 36 and the subject H to be used as the irradiation detecting sensor. As is well known, the photo timer is a device for measuring an irradiation amount of the X-rays for the purpose of performing automatic exposure control (AEC) of the FPD 36, and combined with the FPD 36 to be used. When the photo timer is used as the irradiation detecting sensor, the cost for the components can be suppressed.

The X-ray source controller 14 and the imaging controller 23 may be connected to each other in a wired manner, such that the irradiation start signal entered through the irradiation switch 15 is sent from the X-ray source controller 14 to the imaging controller 23, and the timing for emitting the X-rays from the X-ray source 13 is synchronized with the timing for starting the accumulation operation of the signal charges by the FPD 36.

Instead of the successive reset method in which the pixels 37 are reset on a row-by-row basis as described in the above embodiment, a parallel reset method or an all-pixel reset method may be performed. In the parallel reset method, plural rows are made into one group and the reset operation is performed on the pixels in the plural rows at one time in each of the groups, so as to discharge the dark charges in plural rows at one time. In the all-pixel reset method, the dark charges in all the pixels are discharged at one time by inputting the gate pulses to all the rows. By using the parallel reset method or the all-pixel reset method, the reset operation can be accelerated.

There are several types of X-ray sources that eliminate the need for the warm-up, such as a fixed anode type having a non-rotating anode, a cold cathode type being in no need of preheating. Thus, the irradiation switch may have only the function of issuing the irradiation start signal. Even in the case of the X-ray source requiring the warm-up operation, the irradiation start signal is inputted to the X-ray source controller through the irradiation switch, and then the X-ray source controller is caused to start the warm-up in response to the irradiation start signal, and after the completion of the warm-up, the X-ray irradiation is started. Thereby, the irradiation switch does not need to have the function of issuing the warm-up start signal.

In the above embodiment, the electronic cassette and the imaging controller are configured separately, but the electronic cassette and the imaging controller may be integrated together by, for example, providing the function of the imaging controller to the control circuit of the electronic cassette. Instead of the console, the imaging controller may carry out the image processing.

Although the electronic cassette is taken as an example for the portable X-ray image detector in the above embodiment, the present invention may be applied to the X-ray image detector of a floor-standing type.

The present invention is applicable to not only an imaging system using the X-rays but also an imaging system using other kinds of radiation such as y-rays.

Various changes and modifications are possible in the present invention and may be understood to be within the present invention.

What is claimed is:

1. A radiation image detector comprising:
   a plurality of pixels two-dimensionally arranged in columns and rows, a plurality of said columns forming one group, and each of said pixels accumulating signal charges by an amount corresponding to an amount of radiation;
   a signal processing circuit provided for each of said groups so as to convert said signal charges accumulated in each of said pixels to an electric signal;
   a noise detecting section provided for each of said groups so as to detect a noise signal containing no signal charges corresponding to said radiation; and
   a subtractor for subtracting said noise signal from said electric signal in each of said groups.

2. A radiation image detector as defined in claim 1, wherein said noise detecting section has at least one column of noise detecting elements, and performs the subtraction on said pixels and said noise detecting elements in the same row.

3. A radiation image detector as defined in claim 2, wherein said noise detecting element is equivalent to said pixel whose function of accumulating said signal charges corresponding to said radiation is nullified.

4. A radiation image detector as defined in claim 2, wherein said subtractor subtracts an analog noise signal from an analog electric signal.

5. A radiation image detector as defined in claim 2, wherein said subtractor subtracts a digital noise signal from a digital electric signal.

6. A radiation image detector as defined in claim 2, wherein said signal processing circuit includes:
   an integration amplifier for integrating said signal charges for a predetermined period;
   an amplifier for amplifying said electric signal outputted from said integration amplifier;
   a sample hold section for keeping a level of said electric signal; and
   a multiplexer for successively selecting said electric signal kept by said sample hold section and outputting said electric signal to an A/D converter.

7. A radiation image detector as defined in claim 2, wherein said signal processing circuit is constituted of an ASIC.

8. A radiation image detector as defined in claim 2 being an electronic cassette contained in a portable housing.

* * * * *